Patented Apr. 2, 1940

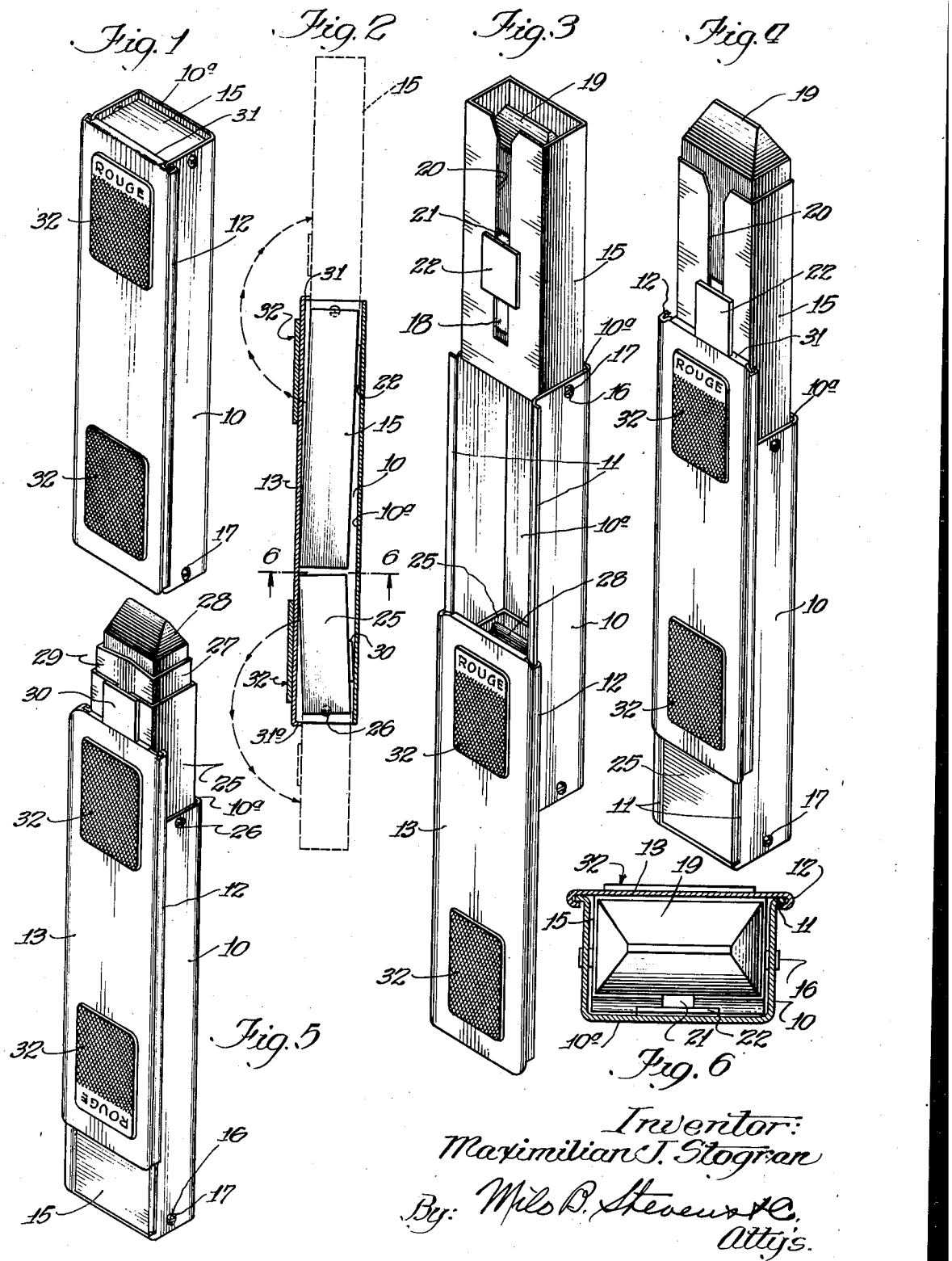

2,196,127

UNITED STATES PATENT OFFICE 2,196,127

LIPSTICK APPLIANCE

Maximilian J. Stogran, Chicago, Ill., assignor to Frances I. Meserole, Blue Island, Ill.

Application May 4, 1939, Serial No. 271,764

16 Claims. (Cl. 132—79)

My invention relates to devices for applying lipstick, and more particularly to those which are made in compact or collapsible form so as to take up little room and be easily carried in the purse, and my main object is to provide a device of this kind which contains both a rouge applicator and a pencil or implement for the spreading and shaping of the rouge to the desired lip formation.

A further object of the invention is to provide an article of the above character which is entirely self-contained and requires no part to be separated, removed or placed on the side while the device is used or prepared for use.

A still further object of the invention is to provide an article of the above character which can be prepared for use in either capacity by the use of a single hand.

Another object of the invention is to design the novel appliance with means to automatically project either of its functioning elements by the mere opening of the casing which contains them.

Another object of the invention is to construct the novel appliance with a closure which functions in respect to either of its features, yet cannot be removed so as to be mislaid or lost.

An important object of the invention is to design the novel appliance along lines of neatness, compactness and economy.

With the above objects in view and any others which may suggest themselves from the description to follow, a better understanding of the invention may be had by reference to the accompanying drawing, in which—

Fig. 1 is a perspective view of the appliance in the closed position;

Fig. 2 is a vertical section denoting by means of dotted lines the positions to which its rouge applying and distributing elements are projected for use;

Fig. 3 is a perspective view showing the lipstick holder projected prior to extending the lipstick;

Fig. 4 is a similar view, showing the said holder secured in place and the lipstick extended;

Fig. 5 is an inverted view of Fig. 1, with the rouge distributing unit in position for use; and Fig. 6 is an enlarged section on the line 6—6 of Fig. 2.

In accordance with the foregoing objects, specific reference to the drawing indicates the casing of the appliance at 10, the same being a channel of light but springy sheet metal and of shallow rectangular cross section. The rim of the casing is outwardly flanged as indicated at 11 to make a locking slide joint with the side channels 12 of a lid 13. The lid is slidable in one direction to expose the rouge unit, and in the opposite direction to expose the spreader unit.

The rouge unit comprises a long, rectangular container 15, whose bottom is hinged to one end of the casing 10 by being formed with outward studs 16 which enter apertures 17 made in the sides of the casing. The container 15 receives a receptacle 18 for a rouge stick 19 and is slotted in one of its walls as indicated at 20 to permit the passage of a stem 21 from the receptacle 18 to take the form of a finger plate 22. Thus, the rouge stick may be advanced from the encased position of Fig. 3 to that of Fig. 4 by simply advancing the finger plate 22, so that the rouge stick projects from the container 15.

A container 25 similar to the container 15 but considerably shorter is applied to the opposite end of the casing 10. The container 25 is also hinged to the casing as indicated at 26 and contains a receptacle 27 for a spreading pencil 28, the container being slotted at 29 for the action of a finger plate 30 to advance the spreader 28 to the position shown in Fig. 5.

Ordinarily, the appliance is closed, as indicated in Fig. 1, the positions of the containers 15 and 25 then being as shown in Fig. 2. It may be stated now that the containers are under tension when in the confined position by the pressure of their finger plates 22 and 23 on the bottom 10a of the casing, the latter yielding slightly to such pressure. Thus, when the lid 13 is slid down from the position of Fig. 2 to that of Fig. 3, the release of the container 15 will cause it to fly up in the direction indicated by the upper set of arrows in Fig. 2, so as to assume the extended position indicated by the dotted lines in that region, this caused by the tension previously mentioned. The recession of the lid as just described is limited when a lip 31 on its upper end meets the container 25, so that the lid cannot slide further to become separated or dislodged from the casing. The same action applies to the projection of the container 25, it being understood that the lid moves over the encased container 15 when the container 25 is to be exposed and projected. A lip 31a on the inner end of the lid stops the same when the lip meets the container 15.

When the appliance is to be manipulated as described above, it is laid with the casing resting on the extended fingers of the palm. The lid 13 is thus in view, and the same is made with serrated or raised formations 32 near each end to facilitate the application of pressure by the thumb to slide the lid in one or the other direction. One of the formations 32 is marked with the word ROUGE, as indicated, for purposes of identification. Thus, with the appliance appearing as in Fig. 1, the thumb of the hand is applied to the upper formation 32 to draw back on the lid; and when the latter has reached the position of Fig. 3, the rouge container 15 flies out instantly to the extended position indicated. Considering that the appliance is in a practically horizontal position on the fingers of the hand, the container 15 remains extended, and the thumb is then exerted to again advance the lid 13 to a point where it meets the finger plate 22, the further advance of the lid serving to push such finger plate and secures the projection of the rouge stick 19 as in Fig. 4. Or, the finger plate itself is advanced with the thumb, especially if the rouge stick has become short. The rouge may now be put into use by holding the container and finger plate between the forefinger and the thumb.

In order to restore the rouge unit, the thumb is employed to retract the rouge stick and then to retract the lid 13 to the limit of its travel. The appliance then is given a short upward jerk, which serves to throw the rouge container back into the casing. The appliance is now turned around to place the rouge container nearer to the user. Then the thumb is used to compress the container 15 into the casing while the forefinger is applied to the remote end of the lid to draw the same back over the container 15. The appliance is now in a position for the projection of its lipstick spreader 28 and may be actuated precisely as before for this purpose.

It will be evident from the above description that an appliance is had which enables both the rouge and spreader units to be contained in one casing and manipulated by one hand. The units are very compactly encased, yet fully extensible to be freely applicable in any desired direction. The device is so constituted that the hold of either unit may be firm without other movement or exertion than the natural hold of the appliance in the hand, saving effort and attention on the part of the user. The manner of manipulating the units is the same for each, so that when the user becomes familiar with the appliance, a few trials will enable it to be used with ease. Moreover, the fact that both units are usable while attached to the casing precludes their removal or separate handling, so that nothing in the appliance must be laid aside or taken apart, and the user is free to rest the other hand or employ it otherwise. Finally, the appliance is an article of small size, compact construction and neat design, and is adaptable for ornamental development or embellishment in any respect that the fancy may dictate.

While I have described the novel appliance along specific lines, various minor changes and refinements may be made therein without departing from its principle, and I desire to consider all such changes and refinements as coming within the scope and spirit of the appended claims.

I claim:

1. A lipstick appliance comprising an elongated channel, lip-rouge and rouge-spreader units disposed in the end portions of the channel and hinged to the latter in jack-knife relation, and a lid for the channel to enclose the units.

2. The structure of claim 1, the lid being movable to clear either unit for the swinging movement.

3. The structure of claim 1, the lid being movable to clear either unit for the swinging movement, and the channel extending beyond each pivot to a sufficient degree to constitute its floor as a stop for the cleared unit when the latter has been swung to extend endwise of the channel.

4. The structure of claim 1, the lid being slidable along the channel to clear either unit for the swinging movement.

5. The structure of claim 1, each unit including a filler for the corresponding end of the channel to form a closure therefor.

6. The structure of claim 1, the covered channel being of rectangular cross-section, and each unit including a filler with a flat rectangular outer surface to form a closure for the corresponding end of the channel.

7. The structure of claim 1, the channel having longitudinal rim flanges, and the lid having channeled sides to make slide joints with said flanges.

8. The structure of claim 1, the channel having outward longitudinal rim flanges, and the lid having its sides inturned with channels to make slide joints with said flanges.

9. The structure of claim 1, the lid being slidable along the channel to clear either unit for the swinging movement, and means to check the lid from sliding off the channel.

10. The structure of claim 1, the lid being slidable along the channel to clear either unit for the swinging movement, and means to check the movement of the lid beyond the point of said clearance.

11. The structure of claim 1, the lid being slidable along the channel to clear either unit for the swinging movement, and means to check the movement of the lid beyond the point of said clearance, comprising a portion of the other unit serving as an abutment, and a projection of the lid meeting said portion when the lid has moved to the point of said clearance.

12. The structure of claim 1, the lid being slidable along the channel to clear either unit for the swinging movement, and means to check the movement of the lid beyond the point of said clearance, comprising a receptacle forming part of the other unit and serving as an abutment, and a projection of the lid meeting said receptacle when the lid has moved to the point of said clearance.

13. The structure of claim 1, the lid being slidable along the channel to clear either unit for the swinging movement, and means to check the movement of the lid beyond the point of said clearance, comprising a receptacle forming part of the other unit and serving as an abutment, and a lip inwardly of the rear edge of the lid meeting said receptacle when the lid has moved to the point of said clearance.

14. The structure of claim 1, the lid being slidable along the channel to clear either unit for the swinging movement, and means to check the lid from sliding off the channel, said means comprising portions of the units next to the inner side of the lid and inward lips at the ends of the lid, each lip meeting the opposite one of said unit portions as a stop limit when slid in the corresponding direction.

15. The structure of claim 1, the lid being movable to clear either unit for the swinging movement, and means tensioned by the units when enclosed, said means causing either unit to fly out to an extended position endwise of the channel when such unit is cleared by the movement of the lid.

16. The structure of claim 1, the lid being movable to clear either unit for the swinging movement, and projected portions on those faces of the units which face the base of the channel, said base being of spring material and tensioned by said portions, whereby to cause either unit to fly out to an extended position endwise of the channel when such unit is cleared by the movement of the lid.

MAXIMILIAN J. STOGRAN.